United States Patent [19]

Takatsu

[11] Patent Number: 5,311,501
[45] Date of Patent: May 10, 1994

[54] ROUTING SYSTEM FOR LINEAR ADD-DROP MULTIPLEXER

[75] Inventor: Kazuo Takatsu, Kawasaki, Japan

[73] Assignee: Fujitsu Limited, Kawasaki, Japan

[21] Appl. No.: 838,679

[22] Filed: Feb. 21, 1992

[30] Foreign Application Priority Data

Mar. 15, 1991 [JP] Japan ................. 3-049992

[51] Int. Cl.5 .................. H04J 3/08; H04J 3/14
[52] U.S. Cl. ....................... 370/16; 370/55; 370/58.1; 340/825.03
[58] Field of Search ............. 370/16, 16.1, 53, 54, 370/55, 58.1, 58.2, 58.3, 65, 67, 112; 340/825.03, 826, 827, 825.04; 328/103, 104

[56] References Cited

U.S. PATENT DOCUMENTS

| | | | |
|---|---|---|---|
| 4,416,008 | 11/1983 | Takahashi et al. | 370/85.12 |
| 4,434,485 | 2/1984 | Huffman et al. | 370/55 |
| 4,667,319 | 5/1987 | Chum | 370/55 |
| 4,779,263 | 10/1988 | Manabe et al. | 370/58.1 |
| 4,964,095 | 10/1990 | Tyrrell et al. | 370/55 |
| 4,967,405 | 10/1990 | Upp et al. | 370/58.1 |
| 5,003,531 | 3/1991 | Farinholt et al. | 370/16 |
| 5,010,550 | 4/1991 | Hirata et al. | 370/16 |
| 5,018,135 | 5/1991 | Ashi et al. | 370/55 |
| 5,163,041 | 11/1992 | Moriyama | 370/16.1 |
| 5,179,548 | 1/1993 | Sandesara | 370/16.1 |

Primary Examiner—Douglas W. Olms
Assistant Examiner—Alpus H. Hsu
Attorney, Agent, or Firm—Staas & Halsey

[57] ABSTRACT

A routing system for a linear ADM having two drop switches, operates to establish paths according to a relatively simple process and to establish paths according to a program that is relatively small in scale and inexpensive to develop. The routing system includes a first selection switch for selecting one of a plurality of channels connected to a first transmission line and for outputting a first signal transmitted through the selected channel. A first selector selectively outputs and inhibits the first signal transmitted from the first selection switch. The first selection switch and the first selector are provided in one of the drop switches. A second selection switch selects one of a plurality of channels connected to a second transmission line and outputs a second signal transmitted through the selected channel. A second selector inhibits the second signal transmitted from the second selection switch when the first selector outputs the first signal, and outputs the second signal when the first selector inhibits the first signal. The second selection switch and the second selector are provided in the other of the drop switches. The first and second signals are selectively transmitted from the first and second selectors to a transmitter/receiver for lower signal levels.

19 Claims, 6 Drawing Sheets

ROUTING SYSTEM FOR LINEAR ADD-DROP MULTIPLEXER

BACKGROUND OF THE INVENTION (1) Field of the Invention

The present invention relates to a routing system for a linear add-drop multiplexer, and more particularly to a routing system for a linear add-drop multiplexer having a cross-connect function.

(2) Description of the Related Art

Recent demands for higher performance optical transmission systems require add-drop multiplexers (ADM) with a cross-connect function. Generally, ADMs are classified into linear ADMs for use in a linear transmission line and ring ADMs for use in a ring-shaped transmission line. Linear ADMs receive signals from terminals connected to the opposite ends of a bidirectional linear transmission line, and transmit signals to the terminals. When a linear ADM is to receive a signal, one of the terminals (hereinafter referred to as East and West terminals) is selected for a path in use and the other for a path not in use. A channel connected to the terminal selected for a channel in use, is dropped. To drop the channel, the ADM has a routing unit for establishing the path in use to drop the channel to lower signal levels. For signal transmission, one of the East and West terminals is selected for a path in use and the other for a path not in use, with an add channel connected to the path in use. To connect the add channel, the ADM has a gate for transmitting a signal to the path in use.

Figure 1:
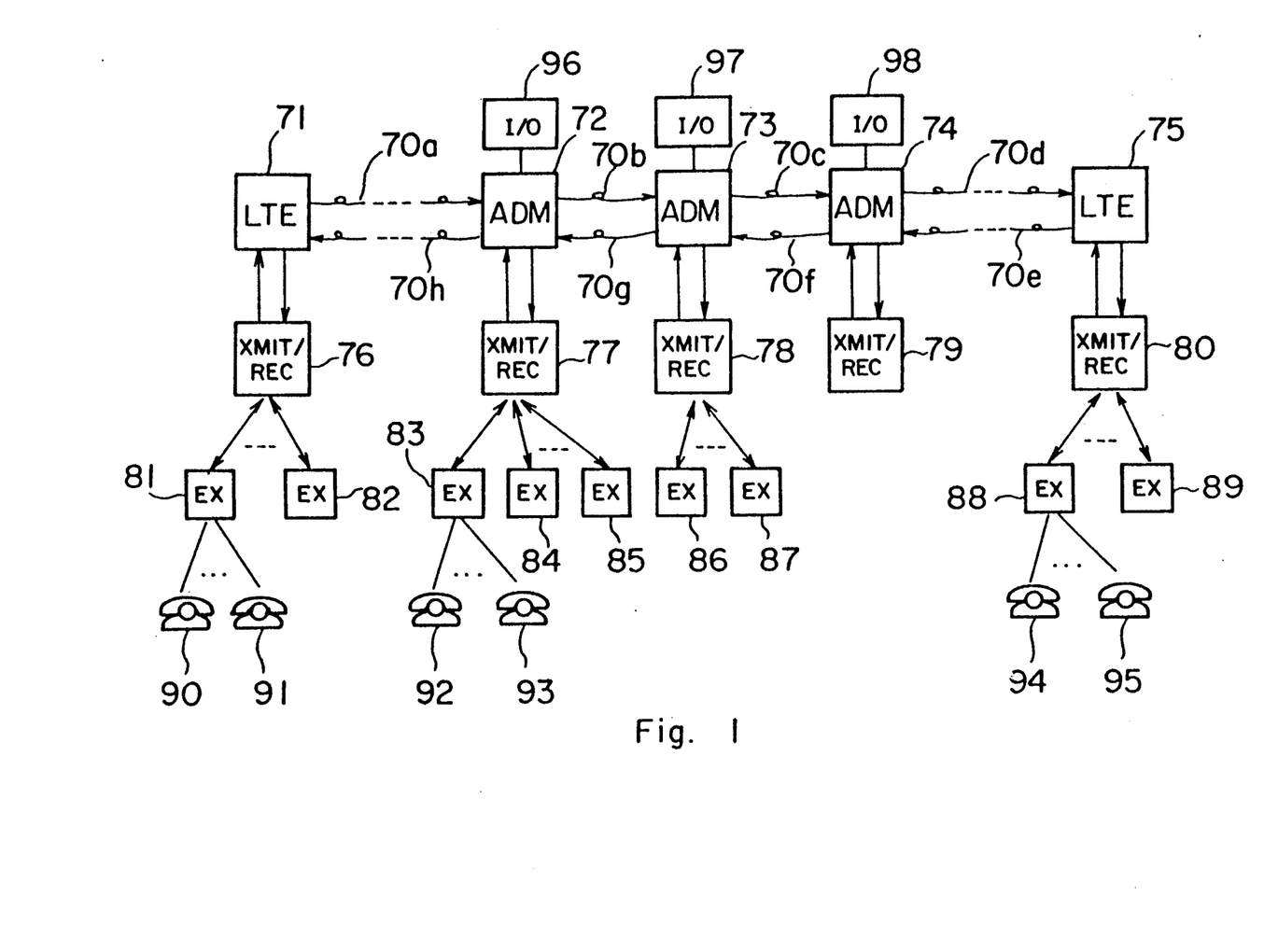
FIG. 1 is a block diagram of an optical transmission system.

FIG. 1 of the accompanying drawings is a diagram of an overall arrangement of an optical transmission system in which ADMs are disposed between linear transmission lines. As shown in FIG. 1, ADMs 72, 73, 74 are disposed between linear optical transmission lines 70a through 70h, with line terminal equipment (LTE) 71, 75 connected to opposite ends thereof. A multiplexed optical signal is transmitted at a rate of 600 Mbits/s over the optical transmission lines 70a through 70h. To the LTE 71, 75 and the ADMs 72, 73, 74, there are connected transmitter/receivers 76, 77, 78, 79 and 80 for lower signal levels, which are connected to exchanges 81, 82, 83, 84, 85, 86, 87, 88 and 89. Telephone sets 90, 91, 92, 93, 94 and 95 or other terminal devices are connected to the exchanges 81, 82, 83, 84, 85, 86, 87, 88 and 89. Input/output devices 96, 97 and 98 are connected to the respective ADMs 72, 73, 74 for applying path connecting commands to the ADMs 72, 73, 74.

In operation, multiplexed optical signals transmitted from the LTE 71, 75 are converted into electric signals and then demultiplexed by the ADMs 72, 73, 74. The ADMs 72, 73, 74 then transmit lower-level signals to the transmitter/receivers 76, 77, 78, 79 and 80 through a path that has been established, thereby providing a drop channel. The ADMs 72, 73, 74 pick up signals, through a path that has been established, out of the lower-level signals transmitted from the corresponding transmitter/receivers 76, 77, 78, 79 and 80, and also out of demultiplexed signals (through signals) that are not transmitted to the transmitter/receivers 76, 77, 78, 79 and 80, thus establishing an add channel. Then, the ADMs 72, 73 and 74 multiplex the picked-up signals, convert them into optical signals, and output the optical signals to the LTE 71, 75. The LTE 71, 75 also establish a drop channel or an add channel based on the established path. The transmitter/receivers 76, 77, 78, 79 and 80 convert the signals that have been transmitted at a rate of 45 Mbits/s from the LTE 71, the ADMs 72, 73, 74 and the LTE 75, into signals at a rate of 1.5 Mbits/s, and transmit the converted signals to the exchanges 81 through 89. Alternatively, the transmitter/receivers 76 through 80 convert signals transmitted at 1.5 Mbits/s from the exchanges 81, 82, 83, 84, 85, 86, 87, 88 and 89 into signals at 45 Mbits/s, and transmit the converted signals to the LTE 71, the ADMs 72, 73, 74 and the LTE 75. The exchanges 81, 82, 83, 84, 85, 86, 87, 88 and 89 convert the signals that have been transmitted at 1.5 Mbit/s from the transmitter/receivers 76, 77, 78, 79 and 80, into signals at a rate of 64 Kbits/s, and transmit the converted signals to the telephone sets 90, 91, 92, 93, 94 and 95. Alternatively, the exchanges 81, 82, 83, 84, 85, 86, 87, 88 and 89 convert signals at 64 Kbits/s from the telephone sets 90, 91, 92, 93, 94 and 95 into signals at 1.5 Mbits/s, and transmit the converted signals to the transmitter/receivers 76, 77, 78, 79 and 80.

Figure 2:
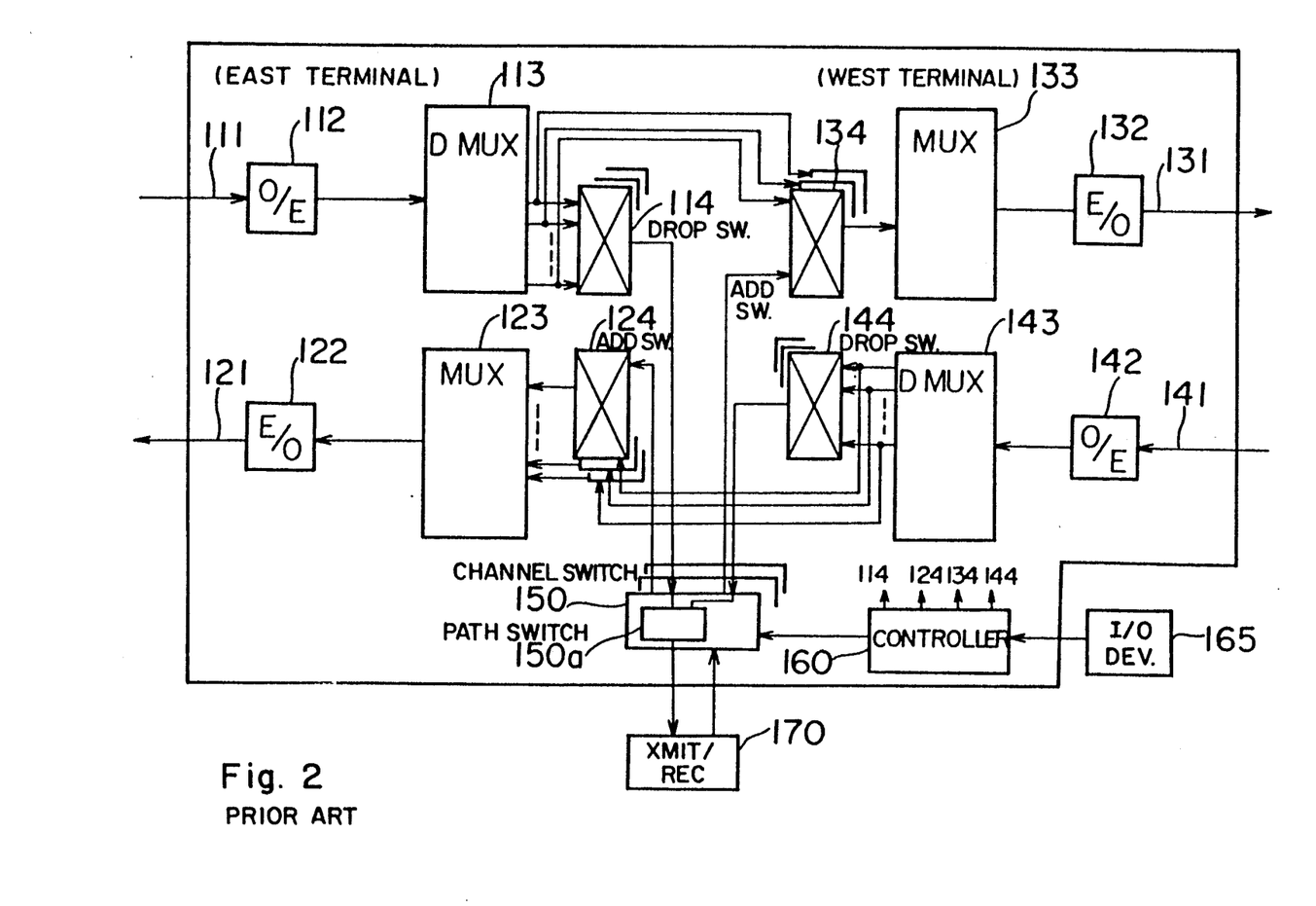
FIG. 2 is a block diagram of a conventional linear ADM.

FIG. 2 of the accompanying drawings is a block diagram of a conventional ADM for use in the above optical transmission system. A multiplexed optical signal of higher signal level transmitted from an optical transmission line 111 connected to an East terminal is converted into an electric signal by an optoelectronic (O/E) transducer 112. The electric signal is then separated by a demultiplexer (DMUX) 113 into a plurality of channels, which are then transmitted to drop switches 114 and add switches 134. There are as many drop switches 114 and as many add switches 134 as the number of channels. Each of the drop switches 114 is connected to all of the channels, and each add switch 134 is connected to one of the channels, thus establishing a through channel. The drop switches 114 select, as a drop channel, one of the channels separated by the demultiplexer 113 in response to a selection signal from a controller 160, and transmit the signal through the selected channel to channel switches 150 for lower signal levels. There are as many channel switches 150 as the number of channels, and the signals from the drop switches 114 are transmitted to these channel switches 150. A drop channel to be selected has previously been indicated to the controller 160 by keystrokes entered through an input/output device 165. The selection signal applied to the drop switches 114 represents the drop channel thus selected.

The channel switches 150 select either the output signal from the drop switches 114 (i.e., the signal received from the East terminal), or an output signal from drop switches 144 (described below—i.e., a signal received from a West terminal), and transmit the selected signal to a transmitter/receiver 170 for lower signal levels. The above selection made by the channel switches 150 is based on a selection signal that is produced by the controller 160 according to keystrokes entered through the input/output device 165, and which is applied to path switches 150a in the respective channel switches 150.

Similarly, a multiplexed optical signal of higher signal level transmitted from an optical transmission line 141 connected to a West terminal is converted into an electric signal by an optoelectronic (O/E) transducer 142. The electric signal is then separated by a demultiplexer (DMUX) 143 into a plurality of channels, which are then transmitted to drop switches 144 and add switches 124. There are as many drop switches 144 and as many add switches 124 as the number of channels. Each of the drop switches 144 is connected to all the channels, and each add switch 124 is connected to one of the channels. The drop switches 144 select, as a drop channel, one of the channels separated by the demultiplexer 143 in response to a selection signal from a controller 160, and transmit the signal through the selected channel to the channel switches 150 for lower signal levels. As described above, there are as many channel switches 150 as the number of channels, and the signals from the drop switches 144 are transmitted to these channel switches 150.

A signal transmitted from the transmitter/receiver 170 is sent through gates (not shown) in the channel switches 150 to the add switches 124 and the add switches 134. The channel switches 150, which are as many as the channels, are connected to the add switches 124, 134, so that all signals from the channel switches 150 are sent to any one of the add switches 124, 134.

In response to a selection signal from the controller 160, the add switches 124 connected to the East terminal select one of the signals in the channels and the one-channel signal from the demultiplexer 143, thus establishing an add channel, and outputs the selected signal to a multiplexer 123. The add switches 124 select the signal based on a selection signal transmitted from the controller 160 representing a channel to be selected, as indicated by the input/output device 165.

Inasmuch as there are as many add switches 124 as the number of channels, the multiplexer 123 is supplied with signals transmitted from the add switches 124 in the respective channels. The multiplexer 123 multiplexes the supplied signals signals into an electric signal, which is then applied to an electro-optic (E/O) transducer 122. The electric signal is then converted by the electro-optic transducer 122 into an optical signal that is outputted to an optical transmission line 121.

Likewise, responsive to a selection signal from the controller 160, the add switches 134 connected to the West terminal select one of the signals in the channels and the one-channel signal from the demultiplexer 113, and output the selected signal to a multiplexer 133. The multiplexer 133 multiplexes the signals supplied from the add switches 134 in the respective channels into an electric signal, which is then applied to an electro-optic (E/O) transducer 132. The electric signal is then converted by the electro-optic transducer 132 into an optical signal that is outputted to an optical transmission line 131.

In the linear ADM, the drop switches connected to the East terminal, the drop switches connected to the West terminal, the add switches connected to the East terminal, the add switches connected to the West terminal, and the channel switches for lower signal levels operate to change channels based on established paths. Therefore, the transmitter/receivers for lower signal levels can be connected to any channels connected to the East and West terminals. The above path exchange capability is known as a cross-connect function.

However, the input/output device 165 is required to command the controller 160 for establishing paths with respect to the five switch assemblies, i.e., the drop switches 114, 144, the add switches 124, 134, and the channel switches 150 which are provided for each of a plurality of channels. Since the number of switch assemblies to be addressed for establishing paths is equal to 5 multiplied by the number of channels, the process of establishing paths with the input/output device 165 is complex and time-consuming. Therefore, there has been a demand for a simplified process of establishing paths which is to be carried out by the input/output device 165.

Heretofore, the path switches 150a in the respective channel switches 150 operate to determine which paths connected to the East or West terminal, are to be dropped based on the selection from the controller 160. The channel switches 150 are normally composed of respective individual block units. Consequently, the block units of the channel switches 150 are connected to the controller 160 by respective control lines. A program for establishing paths with respect to the channel switches 150 approaches the individual path switches 150a in the channel switches.

The drop switches connected to the East terminal, the drop switches connected to the West terminal, the add switches connected to the East terminal, and the add switches connected to the West terminal are normally assembled as four block units, respectively. These four block units are connected to the controller 160 through respective control lines. Therefore, no individual control lines are connected from the controller 160 to the individual drop or add switches. A program for establishing paths with respect to these switches first approaches the block units, and then controls the individual drop or add switches.

The program for establishing paths with respect to the channel switches is more complex than the program for establishing paths with respect to the drop and add switches, because the former program is required to approach the individual channel switches rather than a single block unit. As a consequence, the program for establishing paths with respect to the channel switches is relatively large in scale and highly expensive to develop.

SUMMARY OF THE INVENTION

It is an object of the present invention to provide a routing system for a linear ADM, which operates to establish paths according to a relatively simple process.

Another object of the present invention is to provide a routing system for a linear ADM, which operates to establish paths according to a program that is relatively small in scale and inexpensive to develop.

According to the present invention, there is provided a routing system for a linear add-drop multiplexer having a first drop switch connected to a first transmission line, a second drop switch connected to a second transmission line and a channel switch for lower levels connected to the first drop switch and the second drop switch. The routing system includes a first selection switch, which is provided in the first drop switch, for selecting one of a plurality of channels connected to the first transmission line and outputting a signal transmitted through the selected channel. A first selector, which is provided in the first drop switch, selectively outputs and inhibits the signal transmitted from the first selection switch. A second selection switch, which is provided in the second drop switch, selects one of a plurality of channels connected to the second transmission line and outputs a signal transmitted through the selected channel. A second selector, which is provided in the second drop switch, inhibits the signal transmitted from the second selection switch when the first selector outputs the signal, and outputs the signal when the first selector inhibits the signal. Output means, which is provided in the channel switch, outputs the signals transmitted from the first and second selectors to a transmitter/receiver for lower signal levels.

In the routing system, no paths are required to be established with respect to channel switches for lower signal levels. Therefore, the process of establishing paths is simplified, and the program executed to establish paths is reduced in scale and can be developed inexpensively.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

The principles of the present invention will first be described below with reference to FIG. 3. A linear ADM comprises a drop switch 10 connected to an East terminal, an add switch 20 connected to the East terminal, an add switch 30 connected to a West terminal, a drop switch 40 connected to the West terminal, and a channel switch 50 for lower signal levels.

The drop switch 10 has a selection switch 11 and a selector 12, and the drop switch 40 also has a selection switch 41 and a selector 42. The selection switch 11 is responsive to a selection signal from a controller 1 to select one of the signals supplied in a plurality of channels, and output the selected signal to the selector 12. The selected signal is referred to as a "first signal." The selection signal is output from the controller 1 based on a command from an input/output device 2 which is operated to established a path.

In addition to the first signal, the selection switch 11 outputs a second signal from an unequipped code (UE) section 11a to the selector 12, where the second signal is equal to a selected signal having all data bits set to 0. In response to the selection signal from the controller 1, the selector 12 outputs one of the signals applied thereto to the channel switch 50. Since the second signal is equal to the selected signal having all data bits set to 0, the application of the second signal from the selector 12 to the channel switches 50 is physically equivalent to the application of no selected signal to the channel switch 50. This also holds true for a fourth signal (described below).

The selection switch 41 of the drop switch 40 operates in exactly the same manner as the selection switch 11. More specifically, the selection switch 41 is responsive to a selection signal from the controller 1 to select one of the signals supplied in a plurality of channels, and to output the selected signal to the selector 42, where the selected signal is referred to as a "third signal." In addition to the third signal, the selection switch 41 outputs a fourth signal from an unequipped code (UE) section 41a thereof to the selector 42, where the fourth signal is equal to a selected signal having all data bits set to 0.

When the selector 12 outputs the first signal, the selector 42 selects and outputs the fourth signal to the channel switch 50, and when the selector 12 outputs the second signal, the selector 42 selects and outputs the third signal to the channel switch 50. Therefore, the channel switch 50 is supplied with a significant signal (which is not a signal having data bits which are all 0) from either the drop switch 10 or the drop switch 40, one at a time, without any signal overlapping. The channel switch 50 then outputs the supplied signal, as it is, to a transmitter/receiver 70 for lower signal levels.

By previously specifying paths in which signals are to be outputted from the selectors 12, 42, therefore, it is not necessary to establish paths with respect to the channel switch 50. Thus the process of establishing paths is simplified. The selection switch and the selector which are connected to the East terminal are assembled as a single block unit, and the selection switch and the selector which are connected to the West terminal are also assembled as a single block unit. Consequently, a program that is executed by the controller 1 to establish paths with respect to the selection switches and the selectors may be reduced in scale, and developed inexpensively.

The add switch 20 comprises a selection switch 21 and a selector 23, and the add switch 30 also comprises a selection switch 31 and a selector 33. The channel switch 50 has a first code adder 52 which serves as a first code adding means and a second code adder 53 which serves as a second code adding means. The first code adder 52 adds an equipped code or an unequipped code to a received signal at a predetermined code position thereof, and the channel switch 50 outputs the signal with a code added thereto to the add switch 21. The second code adder 53 adds an unequipped code or an equipped code, complementarily to those added by the first code adder 52, to a received signal at a predetermined code position thereof, and the channel switch 50 outputs the signal with a code added thereto to the add switch 31. Whether an equipped code or an unequipped code is to be added by the first and second code address 52, 53 is specified by the input/output device 2, which controls the controller 1 to apply a code selection signal to the channel switch 50.

In response to a selection signal from the controller 1, the selection switch 21 selects one of the signals transmitted in a plurality of channels from channel switches for lower signal levels, and a one-channel through signal from the drop switch 40, and outputs the selected signal to the selector 23. The selection switch 21 has an unequipped code (UE) section 21a in which all data bits of the selected signal are set to 0, and outputs the signal to the selector 23. The selector 23 normally outputs the former one of the two supplied signals. However, when the path is broken, i.e., when the ADM does not add any channel or does not establish any through channel, the selector 23 outputs the latter signal with the unequipped code thereto according to the common generic criteria. The selection switch 31 and the selector 33 of the add switch 30 operate in exactly the same manner as the selection switch 21 and the selector 23 of the add switch 20.

A linear ADM for transmitting and receiving multiplexed signals in 12 channels will be described below with reference to FIG. 4. Those components shown in FIG. 4 which correspond to those shown in FIG. 3. are denoted by identical or corresponding reference characters. As shown in FIG. 4, the linear ADM includes drop switches 10a through 10n in 12 channels and add switches 20a through 20n in 12 channels. The drop switches 10a through 10n and the add switches 20a through 20n are connected to an East terminal. The linear ADM also includes add switches 30a through 30n in 12 channels and drop switches 40a through 40n in 12 channels. The add switches 30a through 30n and the drop switches 40a through 40n are connected to a West terminal. The linear ADM further includes channel switches 50a through 50n for lower signal levels, demultiplexers (DMUX) 3 and 6, multiplexers (MUX) 4 and 5, and a controller 1. The controller 1 is in the form of a microprocessor having a ROM which stores a control program. The drop switches 10a through 10n, the add switches 20a through 20n, the add switches 30a through 30n, and the drop switches 40a through 40n are assembled as respective four block units, which are connected through respective control lines to the controller 1. The channel switches 50a through 50n are assembled as respective 12 block units, which are connected through respective control lines to the controller 1. The linear ADM also has electro-optic transducers (E/O) and optoelectronic transducers (O/E) that are omitted from the illustration.

All signals in 12 channels which have been demultiplexed by the demultiplexer 3 are supplied to each of the drop switches 10a through 10n, and different channels of the respective 12-channel signals are inputted as through channels to the respective add switches 30a through 30n. Single output signals from the respective drop switches 10a through 10n are supplied respectively to the channel switches 50a through 50n. Likewise, all signals in 12 channels which have been demultiplexed by the demultiplexer 6 are supplied to each of the drop switches 40a through 40n, and different channels of The respective 12-channel signals are inputted as through channels to the respective add switches 20a through 20n. Single output signals from the respect drop switches 40a through 40n are supplied respectively to the channel switches 50a through 50n.

The channel switches 50a through 50n output all output signals, i.e., output signals in 12 channels, to each of the add switches 20a through 20n. The add switches 20a through 20n output respective single output signals to the multiplexer 4. Similarly, all the output signals, i.e., the output signals in 12 channels, from the channel switches 50a through 50n are applied to each of the add switches 30a through 30n. The add switches 30a through 30n output respective single output signals to the multiplexer 5.

In the drop switch 10a, the 12-channel signals demultiplexed by the demultiplexer 3 are applied to the selection switch 11, and one of the 12-channel signals is outputted as a through signal to the add switch 30a. The selection switch 11 of the drop switch 10a selects a channel to be dropped from the 12 channels supplied from the multiplexer 3. The selection switch 11 is responsive to a selection signal from the controller 1 to select one of the signals supplied in 12 channels, and outputs the selected signal as a first signal to the selector 12. The selection signal from the controller 1 is outputted based on a command from an input/output device shown in FIG. 4) which corresponds to the input/output device 2 shown in FIG. 3. The command from the input/output device is based on a path to be established. A code has been added, to a byte C2 at a predetermined code position of the first signal by a transmission side. The code represents the format of data mapped for payloads (described below) in the frame format of the first signal. The first signal is sent as it is to the selector 12.

The selection switch 11 also outputs a second signal, which is equal to the selected signal having all data bits set to 0, from the UE section 11a to the selector 12. All data bits of the byte C2 of the second signal are 0, and the code "00000000" added to the byte C2 is referred to as an "unequipped code." In response to the selection signal from the controller 1, the selector 12 outputs one of the two supplied signals to the channel switch 50a. The application of the second signal which sets all data of the selected signal to 0, from the selector 12 to the channel switch 50a is physically equivalent to the application of no signal whatsoever from the selector 12 to the channel switch 50a. This also holds for a fourth signal (described below).

The selection switch 41 of the drop switch 40a operates in exactly the same manner as the selection switch 11. More specifically, the selection switch 41 selects one of the received 12-channel signals and outputs the selected signal as a third signal to the selector 42 in response to a selection signal from the controller 1. To a byte C2 of the third signal, there has been added by a transmission side, a code representing the format of data.

The selection switch 41 also outputs a fourth signal, which is equal to the selected signal having all data bits set to 0, from the UE section 41a to the selector 42. When the selector 12 outputs the first signal selected from the two supplied signals, the selector 42 outputs the fourth signal to an OR gate 51 of the channel switch 50a, and when the selector 12 outputs the second signal, the selector 42 outputs the third signal to the OR gate 51 of the channel switch 50a. The OR gate 51 transmits the signal supplied from the drop switch 10a or the drop switch 40a directly to transmitter/receiver 70 for lower signal levels. Since the second and fourth signals are the signals with all data bits set to 0, the OR gate 51 outputs the first signal when it is supplied with the first and fourth signals simultaneously, and outputs the third signal when it is supplied with the third and second signals simultaneously. In an alternate embodiment, the OR gate 51 may be replaced with a path for monitoring the bytes C2 of supplied signals and passing only a signal which has an equipped code.

The arrangement and operation of the drop switches 10b through 10n, the drop switches 40b through 40n, and the channel switches 50b through 50n in respective combinations are entirely the same as those of the drop switch 50a, the drop switch 40a, and the channel switch 50a.

As described above, since it is not necessary to establish paths with respect to the channel switches, the process of establishing paths is simplified. The drop switches 10a through 10n connected to the East terminal and the drop switches 40a through 40n connected to the West terminal are assembled as respective single block units. As a result, a program to be executed by the controller 1 for establishing paths is only required to approach these block units and then control the individual drop switches, without the need for approaching the channel switches for all 12 channels, as is the case with the conventional routing system. Accordingly, the program for establishing paths is relatively small in scale and can be developed inexpensively. These advantages of the routing system according to the present invention are particularly effective with an ADM having a cross-connect function capable of changing multiplexed signals (channels). Specifically, it has heretofore been required for the program to effect 14 approaches, i.e., to approach the two block units of drop switches and also to approach the channel switches in 12 channels upon reception of a signal. According to the present invention, however, the program is required to effect only two approaches, i.e., to approach the two block units of the drop switches.

Figure 3:
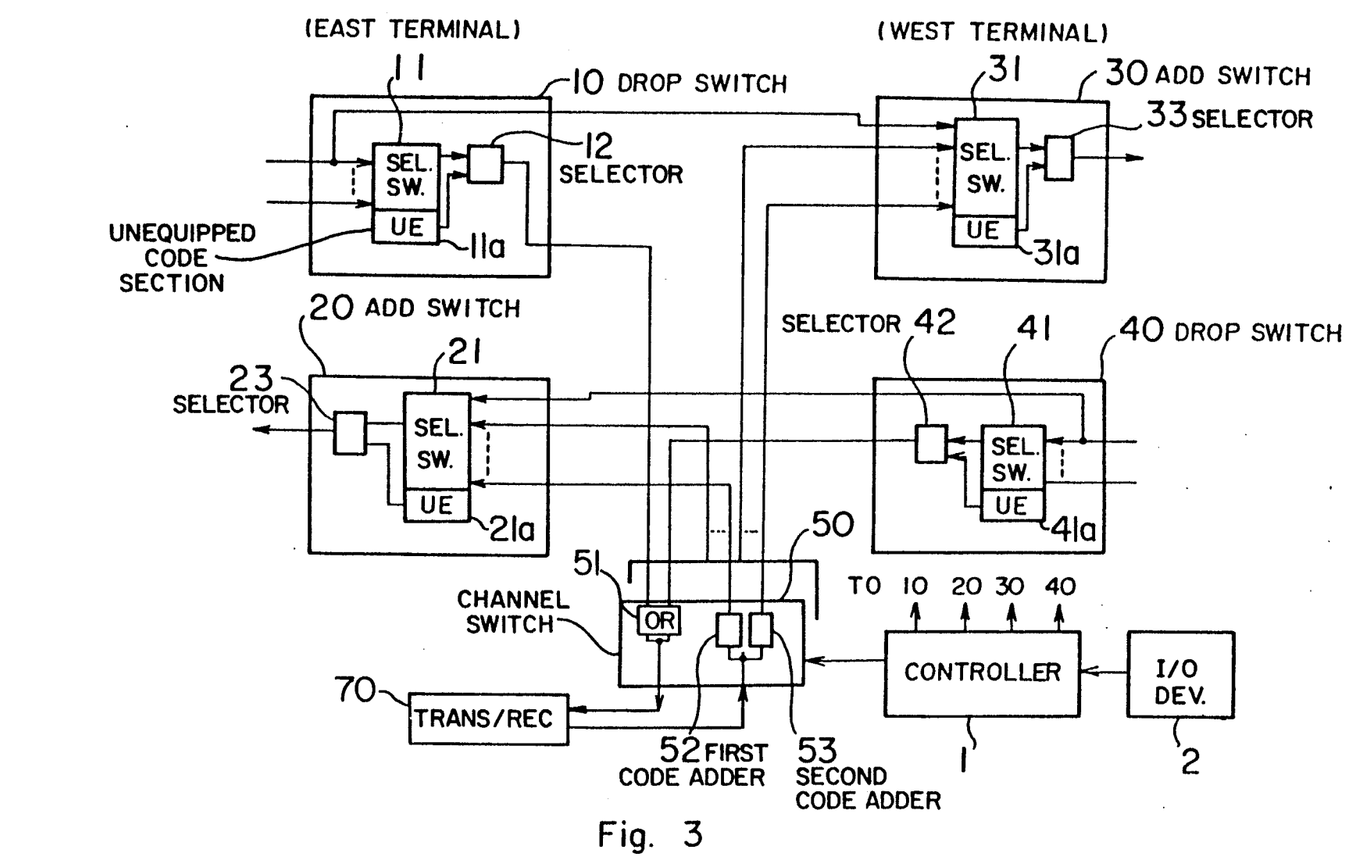
FIG. 3 is a block diagram of a linear ADM in accordance with the present invention.
Figure 4:
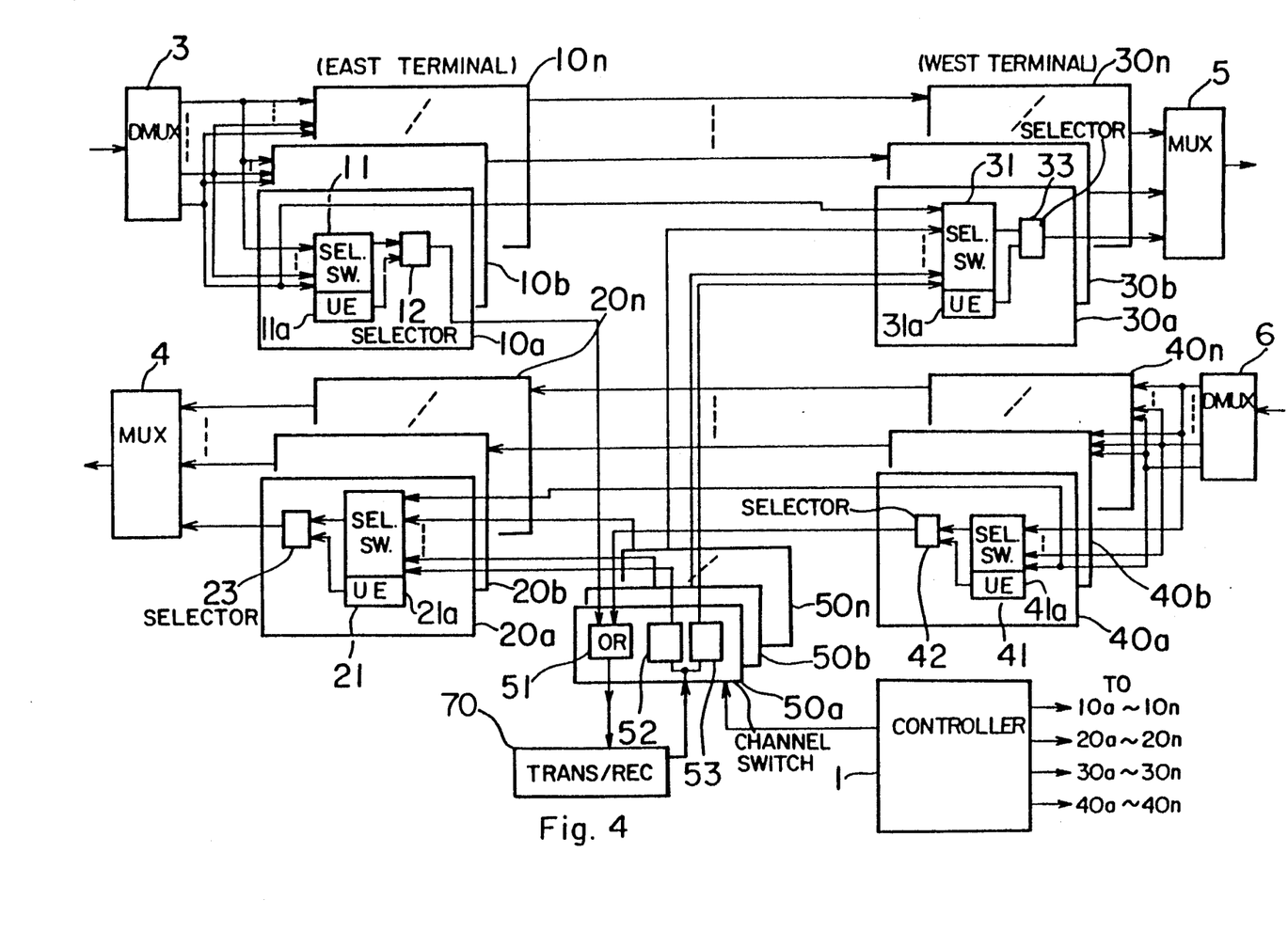
FIG. 4 is a block diagram of a 12 channel implementation of the linear ADM shown in FIG. 3.

The arrangement and operation of the add switches 20a through 20n, the add switches 30a through 30n, and the channel switches 50a through 50n are the same as those of the add switch 20, the add switch 30, and the channel switch 50 shown in FIG. 3, except that the signals are supplied in 12 channels.

Figure 5:
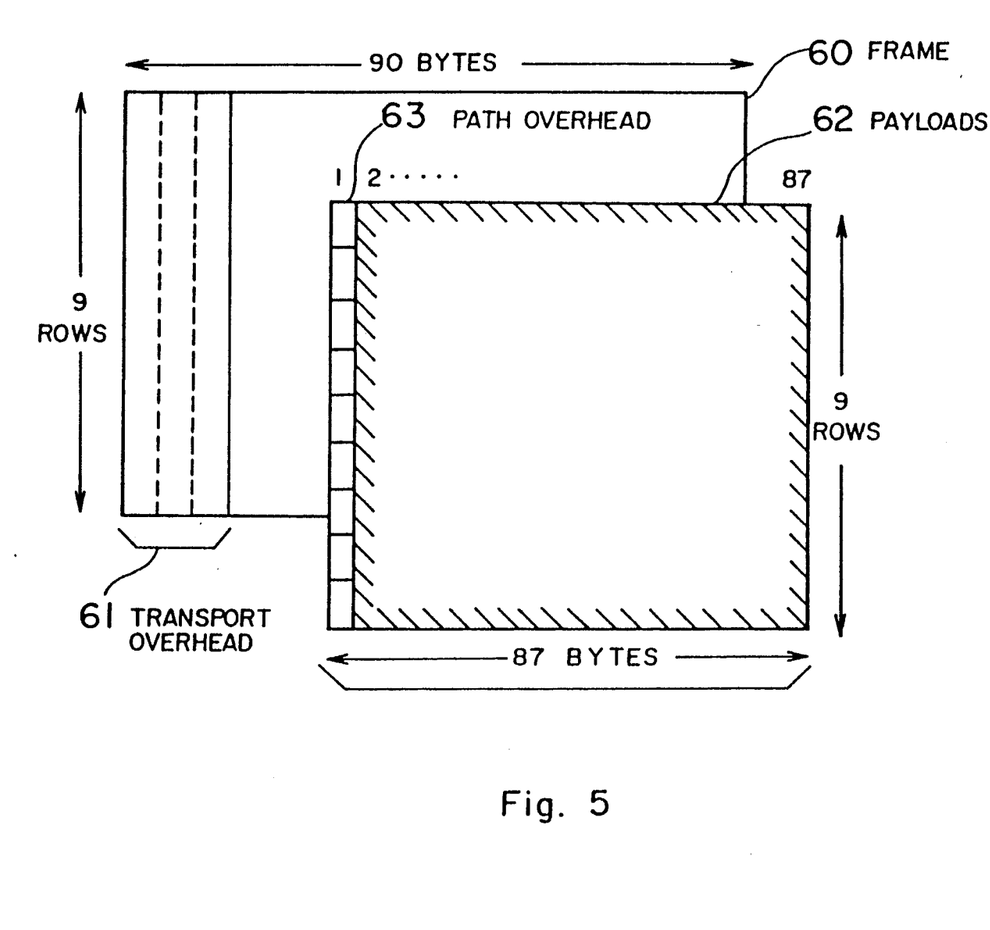
FIG. 5 is a diagram of a SONET STS-1 frame structure.

The byte C2 referred to above will be described below. FIG. 5 shows a frame structure of an STS-1 signal frame employed in the optical transmission system, i.e., a synchronous optical network (SONET). The STS-1 has a frame 60 composed of 90 bytes×9 rows. Of these 90 bytes×9 rows, 3 bytes×9 rows constitute a transport overhead 61 that contains data for supervision and maintenance, and which is removed when dropped by the ADM. The remaining 87 bytes×9 rows serve as a synchronous payload envelope (SPE) that comprises a path overhead 63 of 1 byte×9 rows and payloads (transmitted information) 62 of 86 bytes×9 rows. The path overhead 63 contains the byte C2.

Figure 6:
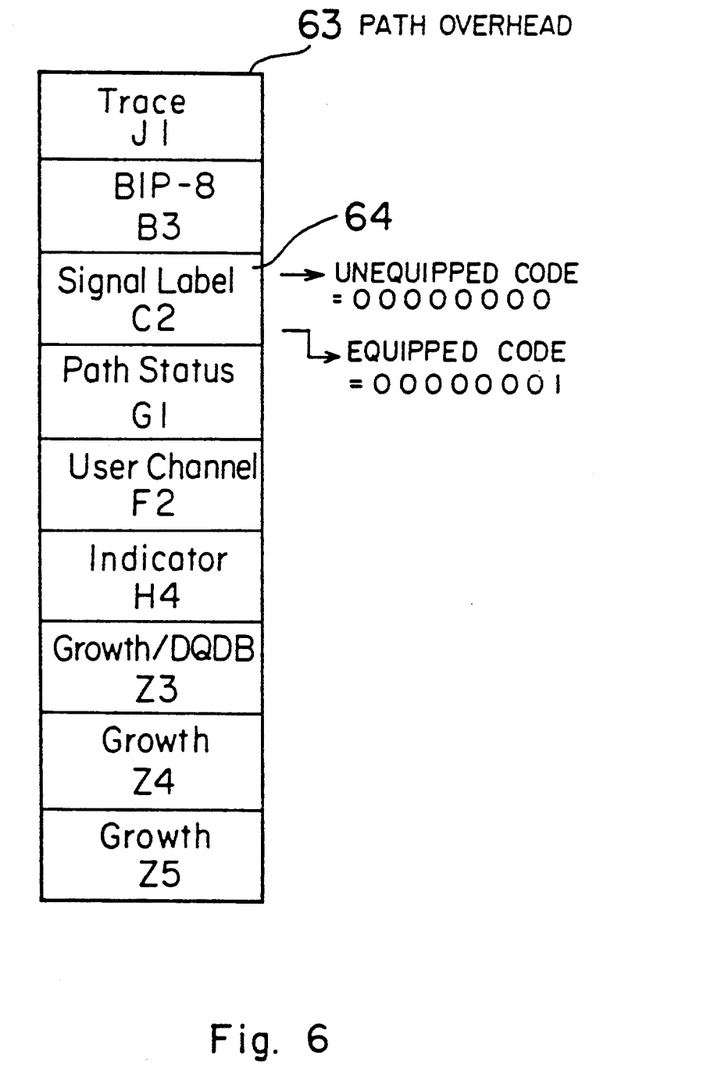
FIG. 6 is a diagram of a path overhead.

FIG. 6 is a detailed diagram of the path overhead 63. The byte C2 corresponds to a signal label C2 64 which is the third byte from the upper end of the path overhead 63. The signal label 64 is a region where a code representing the format of data mapped for payloads 62 is added. If the code added to the signal label 64 is an unequipped code "00000000", this indicates that path terminating equipment is connected but that no path connection is provided. Any other code, which is not "00000000," to be added to the byte C2 is referred to as an equipped code. Other bytes than the byte C2 in the path overhead 63 will not be described in detail as they have no direct bearing on the present invention.

The above embodiment has been described with reference to an optical transmission system which processes signals of the SONET STS-1 frame structure. However, the principles of the present invention are also applicable to optical transmission systems having other frame structures.

The linear ADM described in the above embodiment has a cross-connect function of the time slot assignment (TSA) type. However, the linear ADM according to the present invention nay have a cross-connect function of the time slot interchange (TSI) type.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A routing system for a linear add-drop multiplexer having a first drop switch connected to a first transmission line, a second drop switch connected to a second transmission line, a channel switch for lower levels connected to the first drop switch and the second drop switch and a controller for providing a selection signal, comprising:

a first selection switch, provided in said first drop switch, for selecting one of a first plurality of channels connected to the first transmission line and outputting a first output signal transmitted through the selected channel;

a first selector, provided in said first drop switch and coupled to said first selection switch and the controller, for selectively outputting and inhibiting the first output signal transmitted from said first selection switch to produce a first signal based on the selection signal;

a second selection switch, provided in said second drop switch, for selecting one of a second plurality of channels connected to the second transmission line and outputting a second output signal transmitted through the selected channel;

a second selector, provided in said second drop switch and coupled to said second selection switch and the controller, for inhibiting the second output signal transmitted form said second selection switch when said first selector outputs the first output signal, and for outputting the second output signal when said first selector inhibits the first output signal to produce a second signal based on the selection signal; and output means, provided in said channel switch, for selectively outputting the first and second signals transmitted from said first and second selectors to a transmitter/receiver for lower signal levels;

said first selection switch including means for providing, as the first output signal, a third signal transmitted through said selected channel and a fourth signal having all data bits set to 0;

said first selector comprising means for selecting and outputting one of said third and fourth signals as the first signal;

said second selection switch including means for providing, as the second output signal, a fifth signal transmitted through said selected channel and a sixth signal having all data bits set to 0;

said second selector comprising means for outputting, as the second signal, the sixth signal when said first selector outputs the third signal and the fifth signal when said first selector outputs the fourth signal.

2. A routing system according to claim 1, wherein said routing system is coupled to an external source, further including control means, which can be commanded by the external source and which is connected to said first and second selection switches, for controlling said first and second selection switches to select the channels, said control means including the controller.

3. A routing system according to claim 1, wherein said routing system is coupled to an external source, further including control means, including the controller which can be commanded by the external source and which is connected to said first and second selectors, for controlling said first and second selectors to selectively output and inhibit the first and second output signals.

4. A routing system according to claim 1, wherein said output means comprises an OR gate.

5. A routing system according to claim 1, wherein each of said first and second signals is of a SONET STS-1 frame.

6. A routing system according to claim 5, wherein said output means comprises means for selecting and outputting one of the first and second signals outputted by said first and second selectors which has an equipped code in a byte C2 of said SONET STS-1 frame.

7. A routing system according to claim 6, wherein said equipped code is not the same as an unequipped code in which all bits are 0.

8. A routing system according to claim 1, further including demultiplexers connected to said first and second transmission lines and said first and second selection switches, respectively, for applying demultiplexed output signals to said first and second selection switches, respectively.

9. A routing system according to claim 1, wherein said linear add-drop multiplexer has a cross-connect function.

10. A routing system according to claim 1, wherein:
said first selection switch comprises a plurality of first selection switch devices and said first selector comprises a plurality of first selector devices,
said plurality of first selection switch devices and said plurality of first selector devices are assembled as a single block unit,
said second selection switch comprises a plurality of second selection switch devices and said second selector comprises a plurality of second selector devices,
said plurality of second selection switch devices and said plurality of second selector devices are assembled as a single block unit,
said routing system is connected to an external source and further includes:
  control lines connected to the external source; and
  control means, which can be commanded by the external source and which is connected to said block units through respective said control lines for controlling said block units to select the channels in response to a selection signal from said control means.

11. A routing system according to claim 10, wherein said control means comprises means for establishing paths for said block units, respectively.

12. A routing system according to claim 11, further including add switches for selecting add channels from said first and second plurality of channels.

13. A routing system according to claim 12, wherein said system is coupled to an external source, further including control means, which can be commanded by the external source and which is connected to said add switches, for controlling said add switches to select the add channels.

14. A routing system according to claim 10, further including add switches for selecting add channels from said first and second plurality of channels.

15. A routing system according to claim 14, wherein said routing system is coupled to an external source, further including control means, which can be commanded by the external source and is connected to said add switches, for controlling said add switches to select the add channels.

16. A routing system according to claim 1, further including add switches for selecting add channels from said first and second plurality of channels.

17. A routing system according to claim 16, wherein said routing system is coupled to an external source, further including control means, which can be commanded by the external source and which is connected to said add switches, for controlling said add switches to select the add channels.

18. A routing system for a linear add-drop multiplexer connected to first and second transmission lines and a controller for providing a selection signal, comprising:
a first drop switch connected to the first transmission line and formed as a single block unit, said first drop switch including:
first selection switches, each of which selects a corresponding one of a first plurality of channels connected to the first transmission line and outputs a first signal transmitted through the selected channel; and
first selectors, respectively coupled to said first selection switches and coupled to the controller, each of said first selectors selectively outputting and inhibiting the first signal transmitted from the corresponding one of said first selection switches based on the selection signal;
a second drop switch formed as a single block unit, said second drop switch including:
second selection switches, each of which selects a corresponding one of a second plurality of channels connected to the second transmission line and outputs a second signal transmitted through the selected channel; and
second selectors respectively coupled to said second selection switches and coupled to the controller, each of said second selectors inhibiting the second signal transmitted from the corresponding one of said second selection switches when a corresponding first selector outputs the first signal, and outputting the second signal when the corresponding first selector inhibits the first signal based on the selection signal; and
a channel switch including output means for selectively outputting the first and second signals transmitted from said first and second selectors.

19. A routing system according to claim 18, wherein:
each of said first selection switches includes means for providing, as the first output signal, a third signal transmitted through said selected channel and a fourth signal having all data bits set to 0;
each of said first selectors includes means for selecting and outputting one of said third and fourth signals as the first signal;
each of said second selection switches including means for providing, as the second outputting signal, a fifth signal transmitted through said selected channel and a sixth signal having all data bits set to 0;
each of said selectors includes means for outputting, as the second signal, the sixth signal when the corresponding one of said first selectors outputs the third signal and the fifth signal when the corresponding one of said first selectors outputs the fourth signal.

* * * * *